S. F. SEELY.
Subsoil Plow.

No. 53,891. Patented Apr. 10, 1866.

UNITED STATES PATENT OFFICE.

S. F. SEELY, OF SYLVANIA, OHIO.

IMPROVEMENT IN PLOWS.

Specification forming part of Letters Patent No. 53,891, dated April 10, 1866.

*To all whom it may concern:*

Be it known that I, S. F. SEELY, of Sylvania, Lucas county, State of Ohio, have invented a new and Improved Plow; and I do hereby declare that the following is a full, clear, and exact description thereof, which will enable others skilled in the art to make and use the same, reference being had to the accompanying drawings, forming part of this specification, in which—

Figure 1:
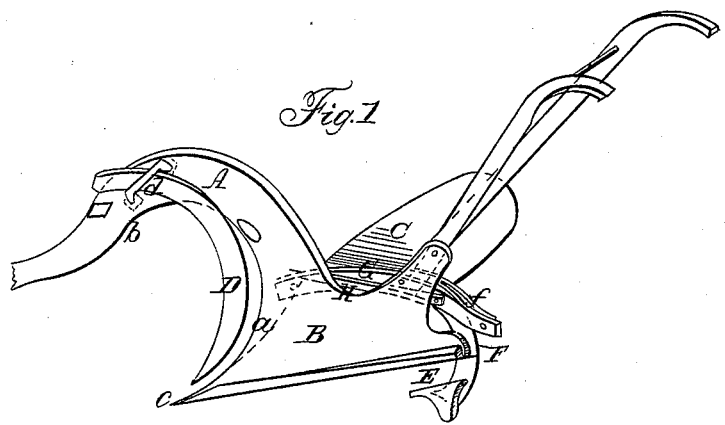
Figure 2:
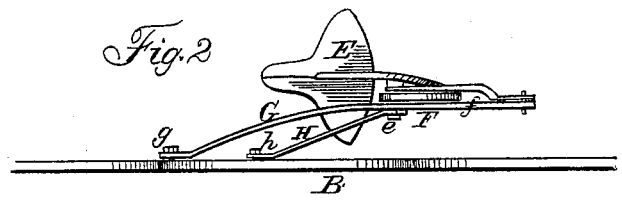

Figure 1 is a perspective view of my invention; Fig. 2, a plan or top view of a portion of the same.

Similar letters of reference indicate like parts.

This invention relates, first, to a new and useful improvement in the construction of the beam of the plow and the colter for the same, whereby the plow is prevented from becoming choked up or clogged with weeds and trash, which are very liable to collect in front of it during the operation of plowing.

The invention relates, second, to a new and improved subsoil-plow attachment so constructed, arranged, and applied that it will have a tendency to penetrate the earth as the plow is drawn along, and to break up and loosen the soil at the bottom of the furrow made by the surface-plow, and at the same time not be liable to break in the event of coming in contact with stones or other obstructions.

A represents the beam of the plow, B the landside, and C the mold-board. The landside and mold-board may be constructed in the usual manner or in any of the known forms. The beam A, however, is different, and is of curved form, the front edge of the upper part of the plow or landside, from the point $a$ and the rear part of the under side of the beam to the point $b$, being a portion of a circle—about a semicircle, or approximating thereto—as shown in Fig. 1. The point $b$ of this semicircular part of the beam projects forward and downward in front of and above the point of the share $c$ of the plow, as shown in Fig. 1, and it will be seen by referring to this figure that weeds, vines, and other trash which may collect in front of the plow will, under the forward movement of the same, be forced upward underneath the beam and then forward, and will descend by their own gravity downward, the semicircular concave surface effectually preventing the weeds and trash from collecting and lodging underneath the beam—a contingency which occurs very frequently in using the ordinary plows in grassy or weedy ground, and which seriously embarrasses the plowman, causing considerable delay and extra labor in plowing.

When a colter is required, as is the case in plowing sward-ground, it is attached to the beam by an eyebolt, $d$, or a clip.

The colter, (designated by D,) is also curved in semicircular form corresponding to the semicircular rear part of the beam, as shown in Fig. 1, and having a position slightly in advance of the rear part of the beam and the front edge of the plow. It will be seen that this semicircular form of the colter will also prevent the weeds and trash from clogging or choking up the plow, the same effect being obtained as with the curved rear part of the beam.

E represents a subsoil-plow, which is of arched form in its transverse section, and is attached to a standard, F, of curved form. The upper end of this standard is secured by a pivot, $e$, in the front end of an oblong loop, $f$, at the rear end of a bar, G, the front end of which is attached by a pivot, $g$, to the landside of the plow, and this bar G is braced by a bar, H, the ends of which are secured by pivots $e\,h$ to the bar G and landside. (See more particularly Fig. 2.) The bars G H, as well as the standard F, are of curved form, and the front ends of the bars G H are pivoted to the landside some distance up near the rear end of the beam. This curved form of the standard and bars, together with the elevated point where the bars are attached to the landside, give the subsoil-plow a tendency to sink into the earth as the plow is drawn along. This is a very important feature, as the bottom of the furrow is compacted very hard by the pressure of the sole of the surface-plow, and without this penetrating tendency the subsoil-plow would be quite inefficient, and this is the case with all subsoil-plows attached to surface-plows which have come under my observation—a difficulty effectually obviated by my improvement.

Having thus described my invention, I claim as new and desire to secure by Letters Patent—

1. The curved or semicircular rear part of the beam A and front part of the plow or landside B, substantially as shown, to operate upon weeds, trash, &c., and prevent the same from choking or clogging up the plow, as set forth.

2. The semicircular colter D, in combination with the semicircular rear end of the beam, substantially as and for the purpose specified.

3. The subsoil-plow E, having a curved standard, F, pivoted to curved bars G H, the front ends of which are pivoted to the landside at elevated points, to operate in the manner substantially as and for the purpose herein set forth.

S. F. SEELY.

Witnesses:
S. L. MADGE,
J. J. SMITH.